A. Judd,
Wind Wheel.

Nº 4,491.　　　　Patented May 2, 1846.

A. Judd,
Wind Wheel.
Nº 4,491.    Patented May 2, 1846.

UNITED STATES PATENT OFFICE.

ALLEN JUDD, OF CABOTSVILLE, MASSACHUSETTS.

IMPROVEMENT IN WINDMILLS.

Specification forming part of Letters Patent No. 4,491, dated May 2, 1846.

*To all whom it may concern:*

Be it known that I, ALLEN JUDD, of Cabotsville, in the county of Hampden and State of Massachusetts, have invented a new and useful Improvement in Windmills; and I do hereby declare that the following is a full, clear, and exact description of the principle or character thereof which distinguishes it from all other things before known, and of the manner of making, constructing, and using the same, reference being had to the accompanying drawings, making part of this specification, in which—

Figure 3:
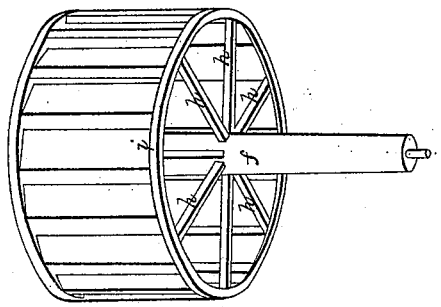
Figure 1:
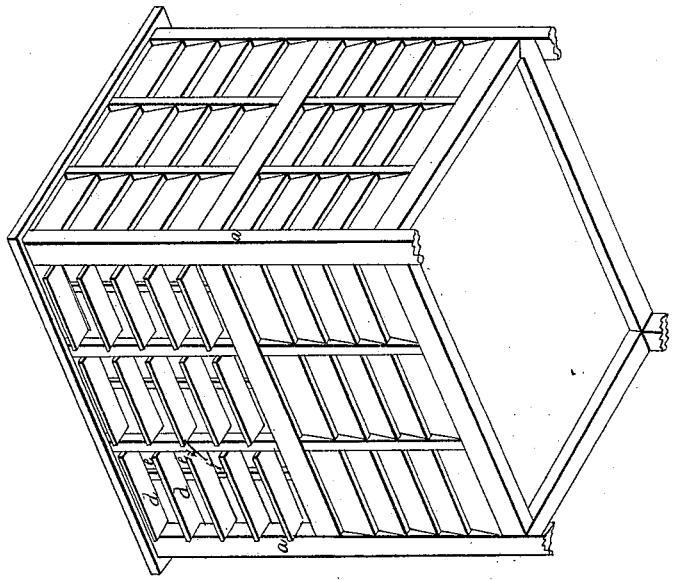
Figure 2:
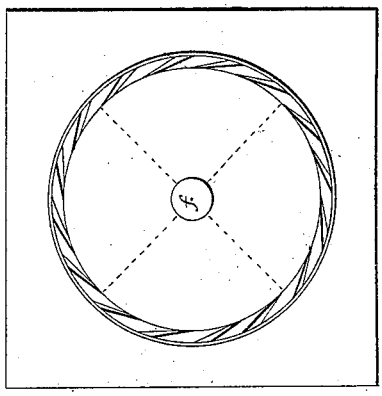
Figure 4:
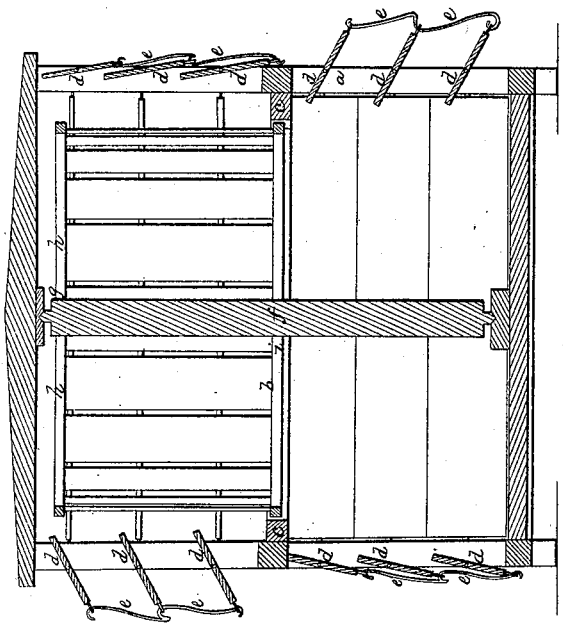

Figure 1 is a perspective view of the outer casing or house surrounding the wind-wheel; Fig. 2, a horizontal section through the wheel and outer casing; Fig. 3, a separate view of the wheel, and Fig. 4 a vertical section of Fig. 1.

The same letters indicate like parts in all the figures.

Wheels to be impelled by currents of wind have been inclosed in a house or outer shell composed of blinds or shutters to admit the wind to the wheel from the side toward the wind and permit its escape on the opposite side; but in this plan the wind only acts on one side of the wheel, and when the wheel is exposed to the direct action of the wind without the above-described arrangement of shutters the vanes on the wheel must be made to turn so as to present feather-edges on one side of the wheel, otherwise the action of the wind would be balanced on both sides and the wheel would not turn. To avoid this objection the vanes have been made oblique and attached to a horizontal shaft, an arrangement which presents many objections; but by my improvement the wind acts on the entire circumference of the wheel at the same time, thus presenting a larger amount of surface within a given compass than can be obtained by any other known plan, and this is effected by placing the vanes around a vertical shaft and at a distance therefrom, and arranged with their planes tangential to the inner circumference of the rims of the wheel to which they are attached, or to some circle of less diameter, with sufficient space between each for the passage of the wind which enters the wheel from below, acts on the inner surfaces of all the vanes and passes out, the wheel being surrounded by two series of shutters or blinds, one series below a floor which is on a level with the lower open rim of the wheel and the other series above this floor, the former being thrown open on the side toward the wind by which it enters the wheel and those of the upper story thrown open on the other side for the escape of the wind after it has acted on the wheel.

In the accompanying drawings, $a$ represents the frame of the building in which the wheel $b$ is located. This frame is divided into an upper and lower compartment by a floor $c$, cut out to receive the lower rim of the wheel, which works freely in this opening in the floor. These two chambers, which may be square, round, or of any other form, are surrounded with shutters $d$, hinged or turning on pins to admit of opening or closing. They may be made in the manner of common turning window-blinds, or each section of the frame may be closed by a single shutter; but when composed of several blinds or shutters, all that compose one section should be connected together by a rod $e$, that they may be closed and opened together. I prefer making this casing four-sided or square to correspond with the four cardinal points of the compass, so that when the wind blows in the direction of the arrows the shutters of the lower chamber on the side toward the wind are opened for the admission of the wind, which passes up into inside of the wheel, and in passing out acts on the vanes of the wheel around the entire circumference, and then passes out of the upper chamber through the shutters on the side opposite to those of the lower chamber; but when the direction of the wind is quartering or between two of the cardinal points, then two sets of shutters in the lower chamber and two in the upper one are opened. The shaft $f$ of the wheel $b$ is vertical, turning in appropriate journals at the top and bottom, and the wheel is attached to it with a solid head $g$ at top and with arms $h$ to connect the lower rim $i$, which forms the lower open end of the wheel for the admission of the wind; but these arms may be dispensed with if this rim is connected with the solid head $g$ by means of the vanes $k$ in a manner to give the requisite strength. The vanes are parallel with the shaft and these ends are let into the solid head $g$ above and the rim $i$ below, and their inner surfaces should be tangential to the inner periphery of the rim $i$ or to some circle of less diameter and leaving sufficient space between them for the free passage of the wind, which, acting from the center of the wheel outward, impinges on the oblique surfaces of the vanes and forces the wheel around in the direction of the arrow.

It will be evident from the foregoing that the surfaces of the vanes may have any inclination tangential to circles of less diameter than the inner periphery of the wheel, and that, if desired, they may be slightly curved, and that these numbers may be decreased or increased at pleasure, so long as sufficient space is left between them for the escape of the wind; and it will also be obvious that the casing surrounding the wheel may be square, round, or of any other form, provided it be divided into two chambers or compartments, one below and the other surrounding the wheel, and that the shutters or blinds may be made of any form, hinged in any desired manner, so long as those of the upper are separated from those of the lower compartment, and then divisions in the direction of the circumference of the casing are such as to present a sufficient amount of open surface for the entrance and escape of the wind,

I claim as my invention and desire to secure by Letters Patent—

A wheel substantially such as herein described, having one end open for the admission of the wind, in combination with a surrounding casing divided into two compartments and composed of shutters, one of the compartments to admit the wind to the inside of the wheel and the other to permit its escape, all substantially as herein described.

ALLEN JUDD.

Witnesses:
J. B. BRIDGMAN,
A. P. BROWN.